US010815631B1

(12) United States Patent
Jia et al.

(10) Patent No.: US 10,815,631 B1
(45) Date of Patent: Oct. 27, 2020

(54) METHOD FOR CEMENTED MATERIAL DAM CONSTRUCTION BASED ON WHOLE-PROCESS QUALITY CONTROL

(71) Applicant: China Institute of Water Resources and Hydropower Research, Beijing (CN)

(72) Inventors: Jinsheng Jia, Beijing (CN); Yang Wang, Beijing (CN); Cuiying Zheng, Beijing (CN); Shuguang Li, Beijing (CN); Wanli Shi, Beijing (CN); Zhongwei Liu, Beijing (CN); Tianjie Lei, Beijing (CN); Lianying Ding, Beijing (CN); Yangfeng Wu, Beijing (CN)

(73) Assignee: CHINA INSTITUTE OF WATER RESOURCES AND HYDROPOWER RESEARCH, Beijing (CN)

(*) Notice: Subject to any disclaimer, the term of this patent is extended or adjusted under 35 U.S.C. 154(b) by 0 days.

(21) Appl. No.: 16/886,787

(22) Filed: May 29, 2020

(30) Foreign Application Priority Data

May 29, 2019 (CN) .......................... 2019 1 0455974

(51) Int. Cl.
E02B 7/06 (2006.01)
E02D 17/18 (2006.01)
E02B 3/16 (2006.01)

(52) U.S. Cl.
CPC .................. E02B 7/06 (2013.01); E02B 3/16 (2013.01); E02D 17/18 (2013.01)

(58) Field of Classification Search
CPC .................................. E02B 7/06; E02D 17/18
(Continued)

(56) References Cited

U.S. PATENT DOCUMENTS 998,813 A * 7/1911 Todt .......................... E02B 7/06
405/117
1,879,430 A * 9/1932 Noetzli ..................... E02B 7/06
405/116
(Continued)

FOREIGN PATENT DOCUMENTS

CN 205576857 U 9/2016
CN 107449827 A 12/2017
(Continued)

OTHER PUBLICATIONS

Jinsheng Jia, et al., Study on Mix Proportion Design and Self-Defense Protective Layer of Cemented Sand and Gravel Dam, Technical Progress in Construction and Management of Reservoir Dams—Proceedings of the 2012 Annual Conference of China Dam Association, Oct. 10, 2012, pp. 442-447.

Primary Examiner — Frederick L Lagman
(74) Attorney, Agent, or Firm — Bayramoglu Law Offices LLC

(57) ABSTRACT

A method for cemented material dam construction based on whole-process quality control includes: determining a water-binder ratio of a sand and gravel material through a simulation test; laying rockfill on the first cemented sand and gravel layer before the final setting time of the first cemented sand and gravel layer; adjusting the maximum particle size of the rockfill and the distance between the particles in the rockfill according to the design requirements; spraying a cement slurry on the rockfill to wrap all the particles in the rockfill and laying a second cemented sand and gravel layer before the initial setting time of the cement slurry; performing rolling compaction on the construction layer until the decline in the thickness of the construction layer and the (Continued)

apparent density of the rolled surface meet the design requirements; and completing the cemented material dam construction.

9 Claims, 1 Drawing Sheet

(58) Field of Classification Search
USPC .................................................. 405/116, 117
See application file for complete search history.

(56) References Cited

U.S. PATENT DOCUMENTS

| | | | | |
|---|---|---|---|---|
| 4,184,786 A * | 1/1980 | Richards | ................ | E02B 3/122 |
| | | | | 405/108 |
| 4,266,885 A * | 5/1981 | Naito | ........................ | E02B 7/06 |
| | | | | 405/109 |
| 4,287,141 A * | 9/1981 | Russell | ..................... | E02B 3/10 |
| | | | | 249/10 |
| 4,521,131 A * | 6/1985 | Nandlal | ..................... | E02B 3/10 |
| | | | | 405/116 |
| 2012/0087735 A1* | 4/2012 | Van Den Broeck | ...... | E02B 3/06 |
| | | | | 405/117 |

FOREIGN PATENT DOCUMENTS

| | | | | | |
|---|---|---|---|---|---|
| CN | 107700435 | * | 2/2018 | .............. | E02B 7/06 |
| CN | 108287125 A | | 7/2018 | | |
| CN | 109338999 A | | 2/2019 | | |
| CN | 109485316 A | | 3/2019 | | |
| DE | 3808269 A1 | * | 9/1989 | .............. | E02D 5/06 |
| JP | 2009121119 A | | 6/2009 | | |

* cited by examiner

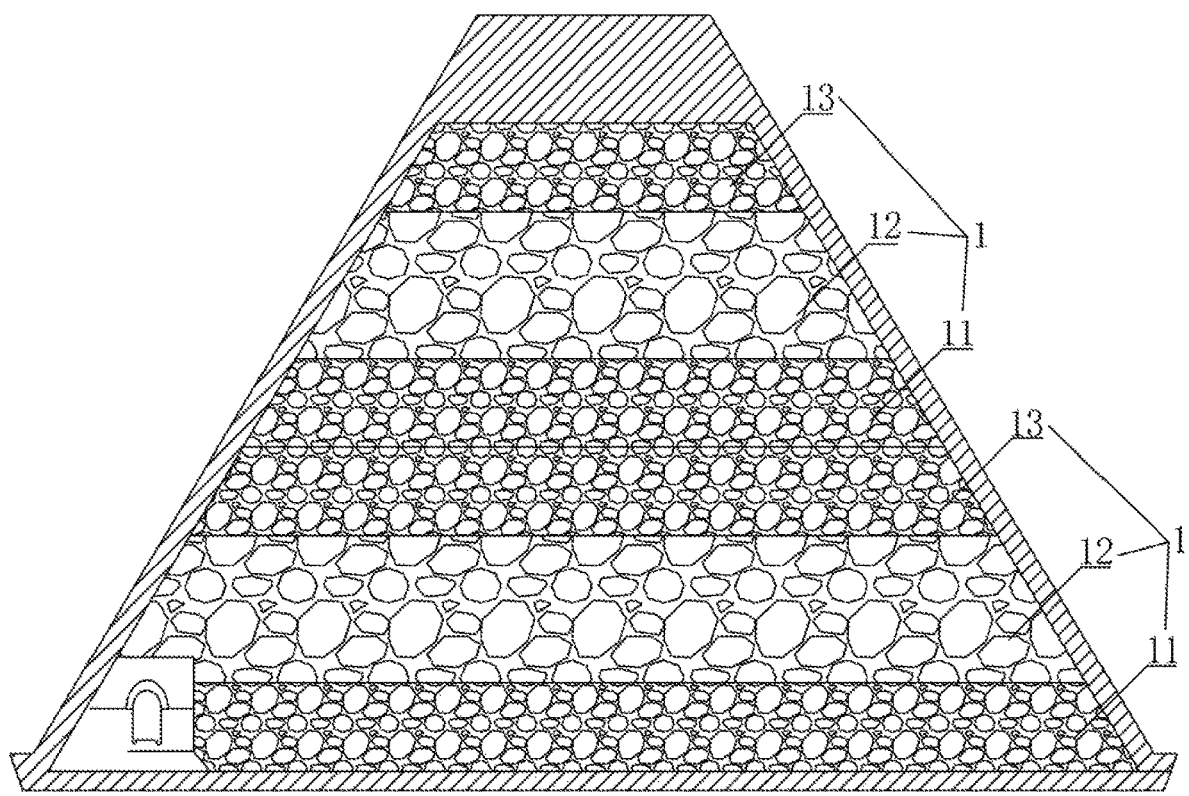

METHOD FOR CEMENTED MATERIAL DAM CONSTRUCTION BASED ON WHOLE-PROCESS QUALITY CONTROL

CROSS REFERENCE TO THE RELATED APPLICATIONS

This application is based upon and claims priority to Chinese Patent Application No. 201910455974.1, filed on May 29, 2019, the entire contents of which are incorporated herein by reference.

TECHNICAL FIELD

The present invention relates to the technical field of quality control of water resources hydraulic engineering construction, and more particularly, to a method for cemented material dam (CMD) construction based on whole-process quality control.

BACKGROUND

The particle size of the aggregate in an existing cemented sand and gravel dam is generally less than 150 mm. In dam construction, the coarse aggregate with a particle size larger than 150 mm is generally removed or crushed to ensure the desired aggregate size. As the particle size of the aggregate increases, the aggregate segregation becomes more severe, causing difficulties in maintaining the strength of the dam. It is, therefore, necessary to control the particle size of the aggregate.

Reservoir sedimentation in China, however, has become a severe problem and affects the flow pattern of rivers. Rock sediments have a wide gradation range and generally include a considerable proportion of stones. According to analyses of the characteristics of dredged slag materials, the dredged slag material with a particle size greater than 200 mm accounts for more than 55% of the underwater dredged material. These dredged slags can be used effectively and recycled to supply the fine aggregate for some adjoining dam sites.

In the current technical field, aggregate with a particle size of less than 150 mm is generally called gravel, and the aggregate with a particle size of more than 150 mm is called rockfill.

A cemented material dam is typically designed to include a plurality of construction layers 1 stacked in sequence. Each construction layer 1 includes the first cemented sand and gravel layer 11, the cemented rockfill layer 12 and the second cemented sand and gravel layer 13, which are successively stacked from bottom to top. The particle size of the aggregate in the cemented rockfill layer 12 is greater than 150 mm. The particle size of the aggregate in the first cemented sand and gravel layer 11 and the particle size of the aggregate in the second cemented sand and gravel layer 13 is less than or equal to 150 mm.

The above-mentioned cemented material dam can make full use of the aggregates having a particle size more than 150 mm, and reduce the aggregate segregation by means of the construction technology and the construction quality control method of the invention, which improves the overall construction quality of the cemented material dam.

SUMMARY

In view of the above-mentioned issues of the prior art, the present invention provides a method for cemented material dam construction based on whole-process quality control, which solves the problems of insufficient utilization of coarse aggregates and waste of resources caused by severe aggregate segregation occurring in existing cemented material dams using coarse rockfill aggregates.

The present invention adopts the following technical solutions to achieve the above-mentioned objective.

A method for cemented material dam construction based on whole-process quality control is provided, including:

step 1, determining a range of a water-binder ratio of a mixed sand and gravel material through a simulation test;

step 2, installing a water flow observation instrument on a water supply pipeline of mixing equipment;

step 3, laying a first cemented sand and gravel layer, and then inserting a Vicat apparatus into the first cemented sand and gravel layer to measure an initial setting time and a final setting time of the first cemented sand and gravel layer, meanwhile, laying rockfill on the first cemented sand and gravel layer; wherein the rockfill is laid on the first cemented sand and gravel layer before the initial setting time of the first cemented sand and gravel layer;

step 4, after the rockfill is laid on the first cemented sand and gravel layer, obtaining image information of the rockfill by an image scanner; according to the image information, statistically calculating and obtain a maximum particle size, a minimum particle size, an average particle size and the distance between particles in the rockfill;

if the calculated maximum particle size of the rockfill is less than or equal to ¼ of the minimum side length of the cross section of the dam body, retaining the rockfill; if the maximum particle size of the rockfill is greater than ¼ of the minimum side length of the cross section of the dam body, removing the rockfill and replacing the rockfill with rockfill satisfying the requirement;

when the measured distance between the particles in the rockfill is greater than the maximum particle size of the cemented sand and gravel, adjusting, by a backhoe excavator or a concrete spreading machine, the distance between the particles in the rockfill until the distance between the particles in the rockfill is less than or equal to the maximum particle size of the cemented sand and gravel;

step 5, when the particle size of the rockfill and the distance between the particles in the rockfill meet the design requirements, spraying cement slurry on the rockfill to fill the distance between the particles in the rockfill and wrap the entire rockfill;

after the cement slurry is sprayed, measuring an initial setting time of the cement slurry by the Vicat apparatus, and laying a second cemented sand and gravel layer before the initial setting time of the cement slurry;

step 6, after a construction layer is constructed by laying the first cemented sand and gravel layer, the rockfill and the second cemented sand and gravel layer, performing rolling compaction on the construction layer;

when the thickness of the construction layer is decreased by 10%, measuring the apparent density of the rolled surface by a nuclear moisture-density gauge;

when the apparent density reaches the design requirements, stopping the rolling compaction;

when the apparent density does not meet the design requirements, performing the rolling compaction while measuring the apparent density of the rolled surface by the nuclear moisture-density gauge and a decline in the thickness of the construction layer;

determining whether the decline in the thickness of the construction layer reaches 20%-30% of the thickness of the construction layer before being subjected to the rolling compaction, and determining whether the apparent density meets the design requirements;

if the decline in the thickness of the construction layer or the apparent density meets the design requirements, stopping the rolling compaction; otherwise, continuing to perform the rolling compaction until the decline in the thickness of the construction layer or the apparent density meets the design requirements;

step 7, determining whether the number of the construction layers reaches a predetermined number; if the number of the construction layers reaches the predetermined number, proceeding to step 8, otherwise returning to step 3; and step 8, measuring compactness inside the dam body by a non-destructive testing method, and performing anti-seepage treatment on the dam according to the compactness, completing the construction of the dam after the anti-seepage treatment.

Further, a method for determining the water-binder ratio in step 1 includes:

sampling the rockfill and the gravel, respectively, adding different amounts of water to the same proportion of gravel, cement and fly ash for the simulation test, recording an amount of water added in each test and a correspondingly sinking depth of the rockfill in the first cemented sand and gravel layer, selecting a water-binder ratio of an amount of water recorded corresponding to the sinking depth of 20%-30% of the rockfill as the water-binder ratio of the mixed sand and gravel material in practical construction.

Further, the water flow observation instrument is a digital flowmeter.

Further, in step 4, the proportion of particles having a distance less than or equal to the largest particle size of the gravel is greater than 95% in the rockfill.

Further, a water-to-cement ratio of the cement slurry in step 5 is the same as the water-binder ratio of the mixed sand and gravel material obtained in step 1.

Further, in step 6, the construction layer is set aside for 10 minutes after being subjected to the rolling compaction once, and the apparent density is measured by the nuclear moisture-density gauge for less than or equal to 30 minutes once, to ensure the accuracy of the nuclear moisture-density gauge.

Further, the thickness of the construction layer after being subjected to the rolling compaction is greater than or equal to 3 times the maximum particle size of the rockfill to ensure sufficient strength of each construction layer.

Further, the total time from the mixing of the mixed sand and gravel material to the completion of the rolling compaction in each construction layer is less than 1.5 h.

Further, the non-destructive testing method in step 8 is an ultrasonic testing method.

The advantages of the present invention are as follows. The optimal water-binder ratio corresponding to different stone materials in different construction sites can be determined through testing. The amount of water added in the mixing process is accurately controlled by the water pump and digital flowmeter installed on the mixing equipment to reduce the difference between the actual water-binder ratio and the tested water-binder ratio. The cemented sand and gravel material can obtain good workability and good strength by accurately controlling the water-binder ratio, which can also ensure an appropriate sinking depth of the rockfill in the cemented sand and gravel layer, improve the binding force between the layers, and minimize the aggregate segregation.

The initial setting times of the cemented sand and gravel layer and the cemented rockfill layer are measured by the Vicat apparatus. The laying time of the upper layer material is controlled before the initial setting time to ensure that aggregates in the upper layer material can sink and be embedded onto the surface of the lower layer material, so as to obtain superior bonding between layers, and reduce aggregate segregation. In this way, the rockfill with a particle size greater than 150 mm can be used in dam construction, which improves the utilization rate of resources.

The pavement quality of the rockfill in the cemented rockfill layer is determined by the image scanner and adjusted in time. After the rolling compaction is completed, the apparent density is measured by the nuclear moisture-density gauge to determine the compactness inside the construction layer. After the entire dam body is constructed, the compactness inside the dam is measured by the ultrasonic testing method, and the construction quality of each construction procedure is monitored in real time and adjusted in time, so as to ensure the construction quality of the dam body and increase the strength of the dam body.

BRIEF DESCRIPTION OF THE DRAWING

FIGURE is a schematic diagram showing a structure of the cemented material dam.

In the FIGURE: 1, construction layer; 11, the first cemented sand and gravel layer; 12, the cemented rockfill layer; 13, the second cemented sand and gravel layer.

DETAILED DESCRIPTION OF THE EMBODIMENTS

The specific embodiment of the present invention will now be described to facilitate understanding of the present invention. However, it should be noted that the present invention is not limited to the scope of the specific embodiments. Various modifications made within the spirit and scope of the appended claims of the present invention may be obvious, and all inventions obtained by using the conception of the present invention shall fall within the scope of protection of the present invention.

A method for the cemented material dam construction based on whole-process quality control includes the following steps.

Step 1, the aggregates are screened and divided into gravel with a particle size of less than or equal to 150 mm and rockfill with a particle size of more than 150 mm by a vibrating screen with an aperture size of 150 mm.

The rockfill and the gravel are sampled, respectively, and different amounts of water are added to the same proportion of gravel, cement and fly ash for the simulation test. The simulation test is as follows: the construction layer 1 is formed in a small area adjoining the construction site by adopting the same procedure as the dam construction, and the sinking depth of the rockfill in the first cemented sand and gravel layer 11 corresponding to the water-binder ratio of the mixed sand and gravel material in each test is recorded, wherein the water-binder ratio corresponding to the sinking depth of 20%-30% is selected as the water-binder ratio of the mixed sand and gravel material in the practical construction.

Step 2, the special mixing equipment is employed to mix the cemented sand and gravel material, after the gravel, cement and fly ash added to the mixing equipment are weighed, the required amount of water is calculated in conjunction with the water-binder ratio in step 1. The digital flowmeter is installed on the water supply pipeline of the mixing equipment. The operator controls the amount of water entering the mixing equipment according to the amount of water supply displayed on the flowmeter, so as to control the water-binder ratio of the cemented sand and gravel material.

In the course of transporting the mixed cemented sand and gravel material to the foundation pit, the cemented sand and gravel material must be continuously stirred to maintain their homogeneity. To reduce the aggregate segregation, the vehicle for transporting the cemented sand and gravel material preferably employs a tilting dump truck.

Step 3, the first cemented sand and gravel layer 11 is laid, and then the Vicat apparatus is inserted into the first cemented sand and gravel layer 11 to measure an initial setting time of the first cemented sand and gravel layer 11, meanwhile, the rockfill is laid on the first cemented sand and gravel layer 11.

According to the initial setting time of the first cemented sand and gravel layer 11, the rockfill is laid on the first cemented sand and gravel layer 11 before the initial setting time of the first cemented sand and gravel layer 11 to ensure that the sinking depth of the rockfill can meet the design requirements.

Step 4, after the rockfill is laid on the first cemented sand and gravel layer 11, an image scanner is employed to scan the captured rockfill photographs into the computer, and then the analysis software performs data analysis on a maximum particle size, a minimum particle size, an average particle size, a distance between particles in the rockfill and others.

The obtained maximum particle size of the rockfill must not be greater than ¼ of the minimum side length of the cross section of the dam body. If the maximum particle size of the rockfill is greater than ¼ of the minimum side length of the cross section of the dam body, the rockfill is removed by a backhoe excavator and replaced with the rockfill that satisfies the requirement.

When the measured distance between the particles in the rockfill is greater than the maximum particle size of the sand and gravel, the distance between the particles in the rockfill are adjusted by a backhoe excavator or a concrete spreading machine until the distance between the particles in the rockfill is less than or equal to the maximum particle size of the sand and gravel to ensure that the proportion of particles having distance less than or equal to the largest particle size of the gravel is greater than 95% in the rockfill.

Step 5, when the particle size of the rockfill and the distance between the particles in the rockfill meet the design requirements, the cement slurry is sprayed on the rockfill to fill the distance between the particles in the rockfill and wrap the entire rockfill. After the cement slurry is sprayed, an initial setting time of the cement slurry is measured by the Vicat apparatus, and the second cemented sand and gravel layer 13 is laid before the initial setting time of the cement slurry. The water-to-cement ratio of the sprayed cement slurry is the same as the water-binder ratio of the cemented sand and gravel material obtained in step 1.

Step 6, after the construction layer 1 is constructed by laying the first cemented sand and gravel layer 11, the cemented rockfill layer 12 and the second cemented sand and gravel layer 13, the vibrating roller is employed to perform rolling compaction on the construction layer 1 by static compaction 2 times and vibration compaction 8 times.

When the thickness of the construction layer 1 is decreased by 10%, the apparent density of the rolled surface is measured by the nuclear moisture-density gauge. The rolled surface is set aside for 10 minutes before being measured by the nuclear moisture-density gauge, so that the components in the construction layer 1 are relatively static, thereby obtaining more accurate test data. The apparent density is measured for less than or equal to 30 minutes.

When the apparent density reaches the design requirements, the rolling compaction is stopped.

When the apparent density does not meet the design requirements, the rolling compaction is performed while the apparent density of the rolled surface is measured by the nuclear moisture-density gauge and a decline in the thickness of the construction layer 1 is measured.

The decline in the thickness of the construction layer 1 is determined whether to reach 20%-30% of the thickness of the construction layer 1 or not, and the apparent density is determined whether to meet the design requirements or not.

If the decline in the thickness of the construction layer 1 or the apparent density meets the design requirements, then the rolling compaction is stopped; otherwise, the rolling compaction continues to be performed until the decline in the thickness of the construction layer or the apparent density meets the design requirements.

Step 7, the number of construction layers 1 is determined whether to reach a predetermined number. If the number of the construction layers 1 reaches the predetermined number, proceeding to step 8, otherwise returning to step 3. The total time from the mixing of the mixed sand and gravel material to the completion of the rolling compaction in each construction layer 1 is less than 1.5 h to ensure that the cemented sand and gravel material and the cement slurry in the cemented rockfill layer maintain the optimal bonding performance.

Step 8, the compactness inside the dam body is measured by the non-destructive testing method. The non-destructive testing method preferably employs the ultrasonic testing method. The ultrasonic probe is employed to emit ultrasonic waves to the inside of the dam body. The ultrasonic waves are diffracted inside the dam body and then received by the ultrasonic receiving probe. The amplitude and propagation time of the received ultrasonic signal are displayed in the form of rectangular coordinates, and the compactness inside the dam body is determined by waveform analysis.

According to the determined compactness, anti-seepage treatment is performed on the dam, and the construction of the dam is completed after the anti-seepage treatment.

What is claimed is:

1. A method for cemented material dam construction based on whole-process quality control, comprising:
   step 1, determining a range of a water-binder ratio of a mixed sand and gravel material through a simulation test;
   step 2, installing a water flow observation instrument on a water supply pipeline of a mixing equipment;
   step 3, laying a first cemented sand and gravel layer, inserting a Vicat apparatus into the first cemented sand and gravel layer to measure an initial setting time and a final setting time of the first cemented sand and gravel layer, and laying a rockfill on the first cemented sand and gravel layer; wherein
   the rockfill is laid on the first cemented sand and gravel layer before the initial setting time of the first cemented sand and gravel layer;
   step 4, after the rockfill is laid on the first cemented sand and gravel layer, obtaining an image information of the rockfill by an image scanner; according to the image information, statistically calculating and obtain a maximum particle size, a minimum particle size, an average particle size and a distance between particles in the rockfill;

retaining the rockfill having the maximum particle size less than or equal to ¼ of a minimum side length of a cross section of a dam body; and removing the rockfill having the maximum particle size larger than ¼ of the minimum side length of the cross section of the dam body;

when the distance between the particles in the rockfill is greater than a maximum particle size of sand and gravel in the first cemented sand and gravel layer, adjusting, by a backhoe excavator or a concrete spreading machine, the distance between the particles in the rockfill until the distance between the particles in the rockfill is less than or equal to the maximum particle size of the sand and gravel in the first cemented sand and gravel layer;

step 5, when the maximum particle size of the rockfill is less than or equal to ¼ of the minimum side length of the cross section of the dam body, and the distance between the particles in the rockfill is less than or equal to the maximum particle size of the sand and gravel in the first cemented sand and gravel layer, spraying a cement slurry on the rockfill to fill the distance between the particles in the rockfill and wrap the particles in the rockfill;

after the cement slurry is sprayed, measuring an initial setting time of the cement slurry by the Vicat apparatus, and laying a second cemented sand and gravel layer before the initial setting time of the cement slurry;

step 6, after a construction layer is constructed by laying the first cemented sand and gravel layer, the rockfill and the second cemented sand and gravel layer, performing rolling compaction on the construction layer;

when a thickness of the construction layer is decreased by 10% of an original thickness of the construction layer before being subjected to the rolling compaction, measuring an apparent density of a rolled surface of the construction layer by a nuclear moisture-density gauge;

when the apparent density reaches a predetermined value, stopping the rolling compaction;

when the apparent density does not reach the predetermined value, performing the rolling compaction on the construction layer while measuring the apparent density of the rolled surface of the construction layer by the nuclear moisture-density gauge and measuring a decline in the thickness of the construction layer;

determining whether the decline in the thickness of the construction layer reaches 20%-30% of the original thickness of the construction layer before being subjected to the rolling compaction, and determining whether the apparent density reaches the predetermined value;

if the decline in the thickness of the construction layer reaches 20%-30% of the original thickness of the construction layer before being subjected to the rolling compaction or the apparent density reaches the predetermined value, stopping the rolling compaction; if the decline in the thickness of the construction layer does not reach 20%-30% of the original thickness of the construction layer before being subjected to the rolling compaction, and the apparent density does not reach the predetermined value, continuing to perform the rolling compaction until the decline in the thickness of the construction layer reaches 20%-30% of the original thickness of the construction layer before being subjected to the rolling compaction or the apparent density reaches the predetermined value;

step 7, determining whether a number of the construction layers reaches a predetermined number; if the number of the construction layers reaches the predetermined number, proceeding to step 8, if the number of the construction layers does not reach the predetermined number, returning to step 3; and step 8, measuring a compactness inside the dam body by a non-destructive testing method, and performing an anti-seepage treatment on the dam body according to the compactness, completing the cemented material dam construction after the anti-seepage treatment.

2. The method for the cemented material dam construction based on the whole-process quality control according to claim 1, wherein, a method for determining the range of the water-binder ratio in step 1 comprises:

sampling the rockfill and sampling the sand and gravel in the first cemented sand and gravel layer, adding different amounts of water to an equal proportion of gravel, cement and fly ash for the simulation test, recording an amount of water added in each test and a correspondingly sinking depth of the rockfill sinking in the first cemented sand and gravel layer, selecting a range of a water-binder ratio of the simulation test as the water-binder ratio of the mixed sand and gravel material in the cemented material dam construction, wherein the range of the water-binder ratio of the simulation test corresponds to a sinking depth of 20%-30% of the rockfill.

3. The method for the cemented material dam construction based on the whole-process quality control according to claim 1, wherein, the water flow observation instrument is a digital flowmeter.

4. The method for the cemented material dam construction based on the whole-process quality control according to claim 1, wherein, in step 4, a proportion of the particles having the distance less than or equal to a largest particle size of the sand and gravel is greater than 95% in the rockfill.

5. The method for the cemented material dam construction based on the whole-process quality control according to claim 1, wherein, a water-to-cement ratio of the cement slurry in step 5 is the same as the water-binder ratio of the mixed sand and gravel material obtained in step 1.

6. The method for the cemented material dam construction based on the whole-process quality control according to claim 1, wherein, in step 6, the construction layer is set aside for 10 minutes after being subjected to the rolling compaction once, and the apparent density is measured by the nuclear moisture-density gauge for less than or equal to 30 minutes once.

7. The method for the cemented material dam construction based on the whole-process quality control according to claim 1, wherein, the thickness of the construction layer after being subjected to the rolling compaction is larger than or equal to 3 times the maximum particle size of the rockfill.

8. The method for the cemented material dam construction based on the whole-process quality control according to claim 1, wherein, a total time from mixing of the mixed sand and gravel material to completion of the rolling compaction in each construction layer of the construction layers is less than 1.5 h.

9. The method for the cemented material dam construction based on the whole-process quality control according to claim 1, wherein, the non-destructive testing method in step 8 is an ultrasonic testing method.

* * * * *